Figure 9:
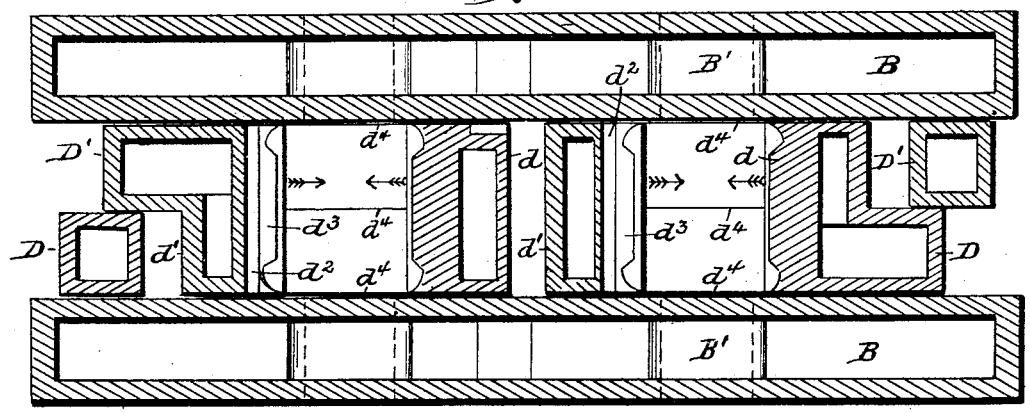

No. 738,090. PATENTED SEPT. 1, 1903.
F. WHITE.
APPARATUS FOR COMPRESSING AND DRYING PEAT INTO BLOCKS OF PEAT.
APPLICATION FILED JULY 3, 1902.
NO MODEL. 8 SHEETS—SHEET 1.
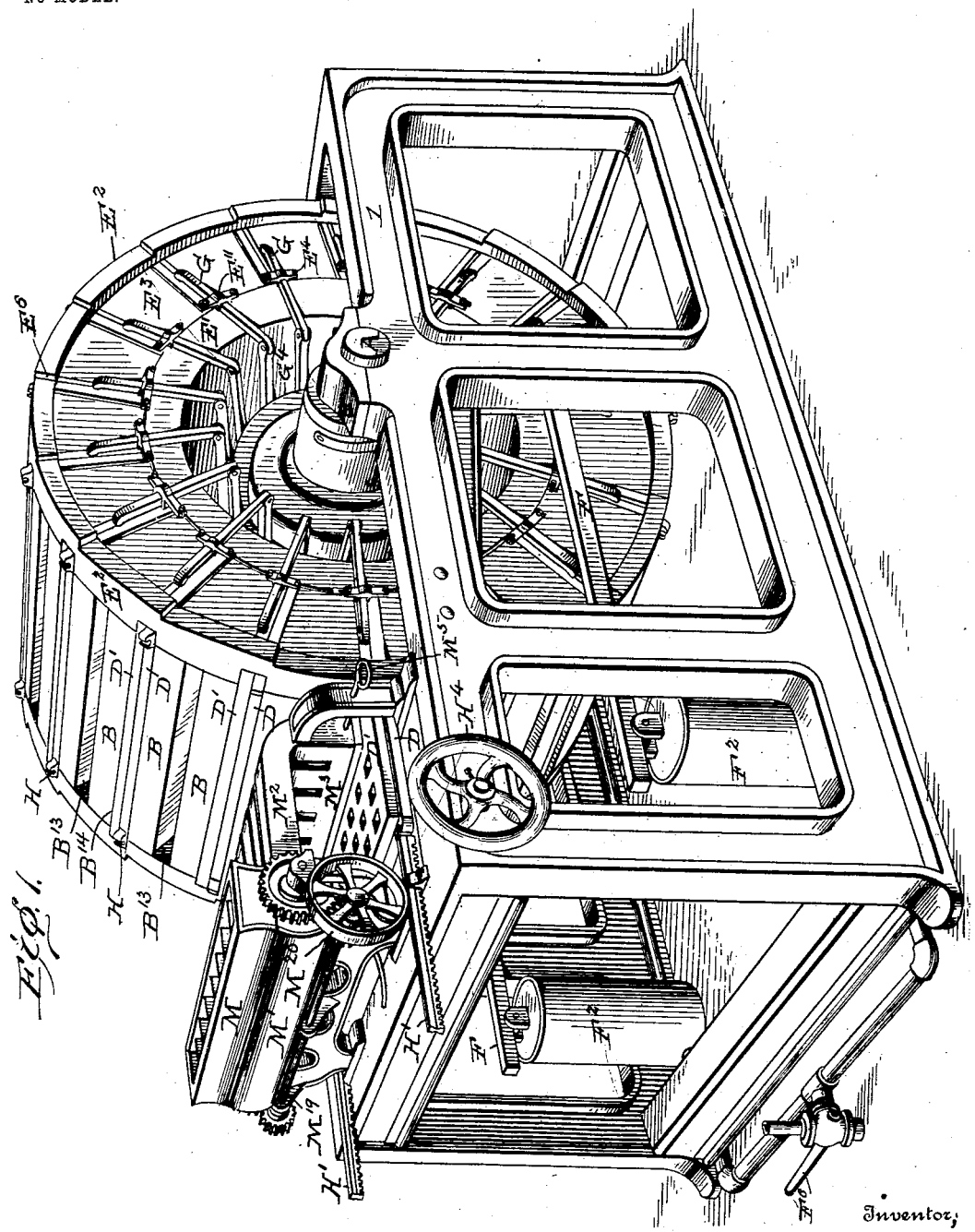

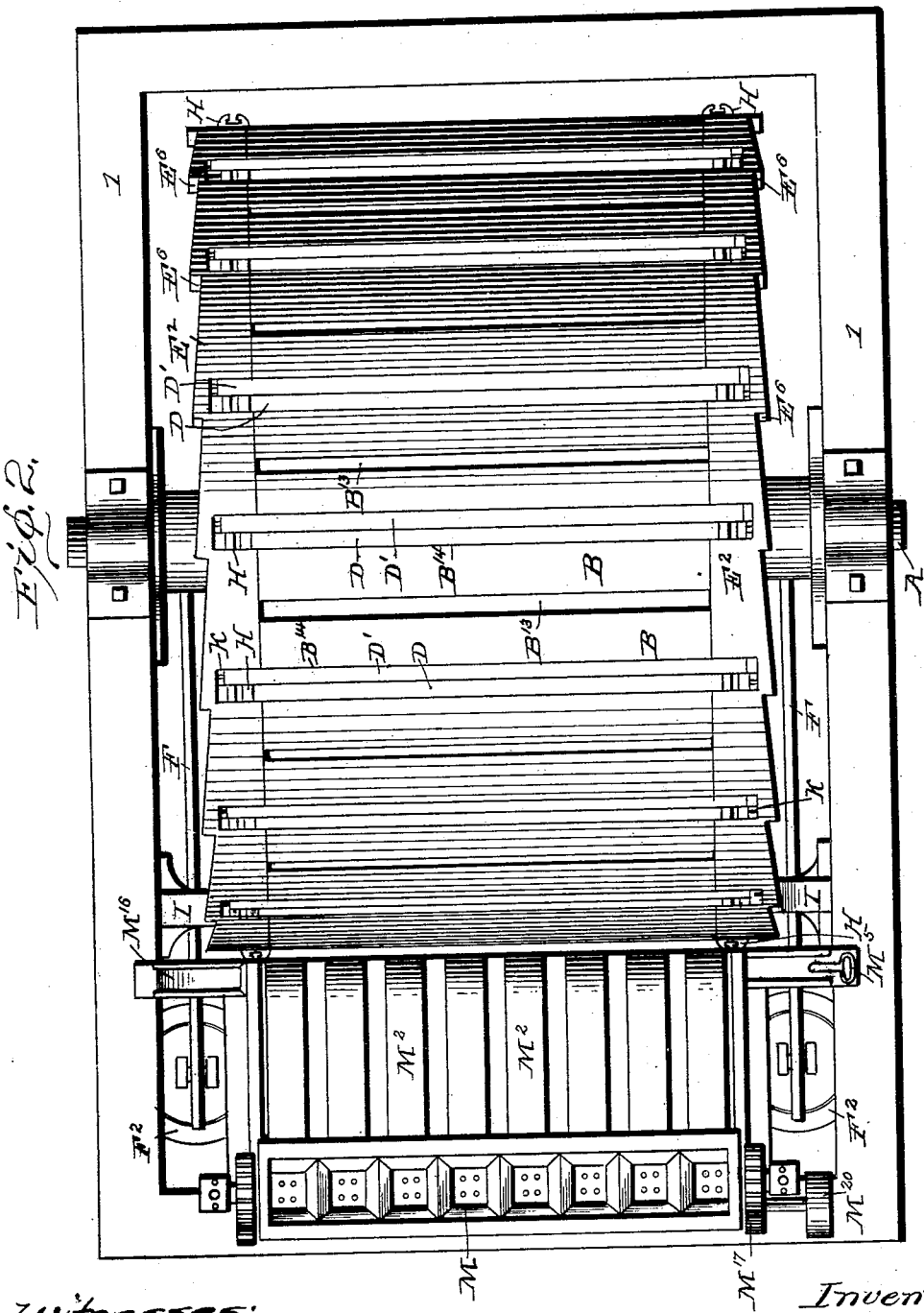

No. 738,090. PATENTED SEPT. 1, 1903.
F. WHITE.
APPARATUS FOR COMPRESSING AND DRYING PEAT INTO BLOCKS OF PEAT.
APPLICATION FILED JULY 3, 1902.
NO MODEL. 8 SHEETS—SHEET 3.
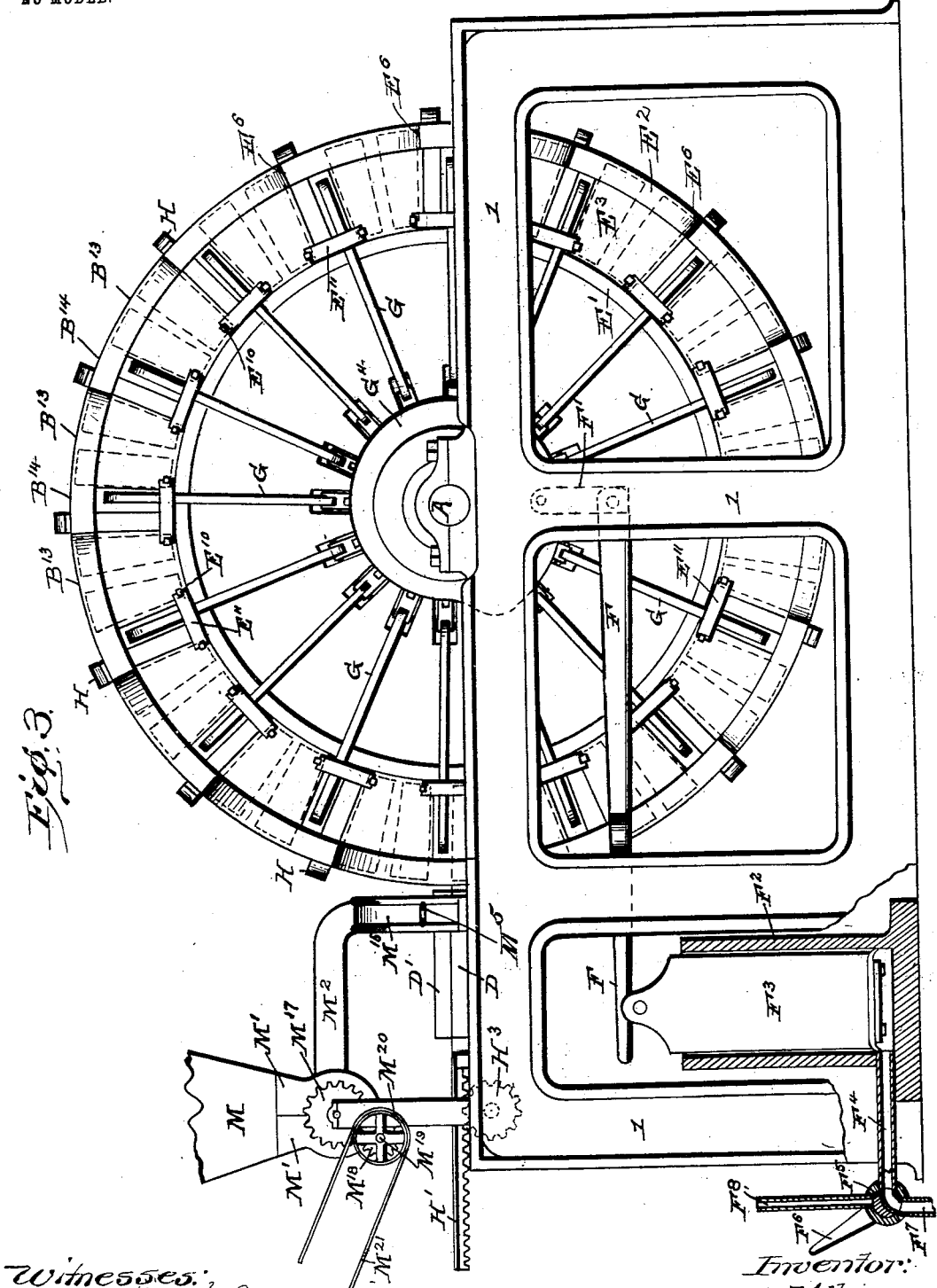

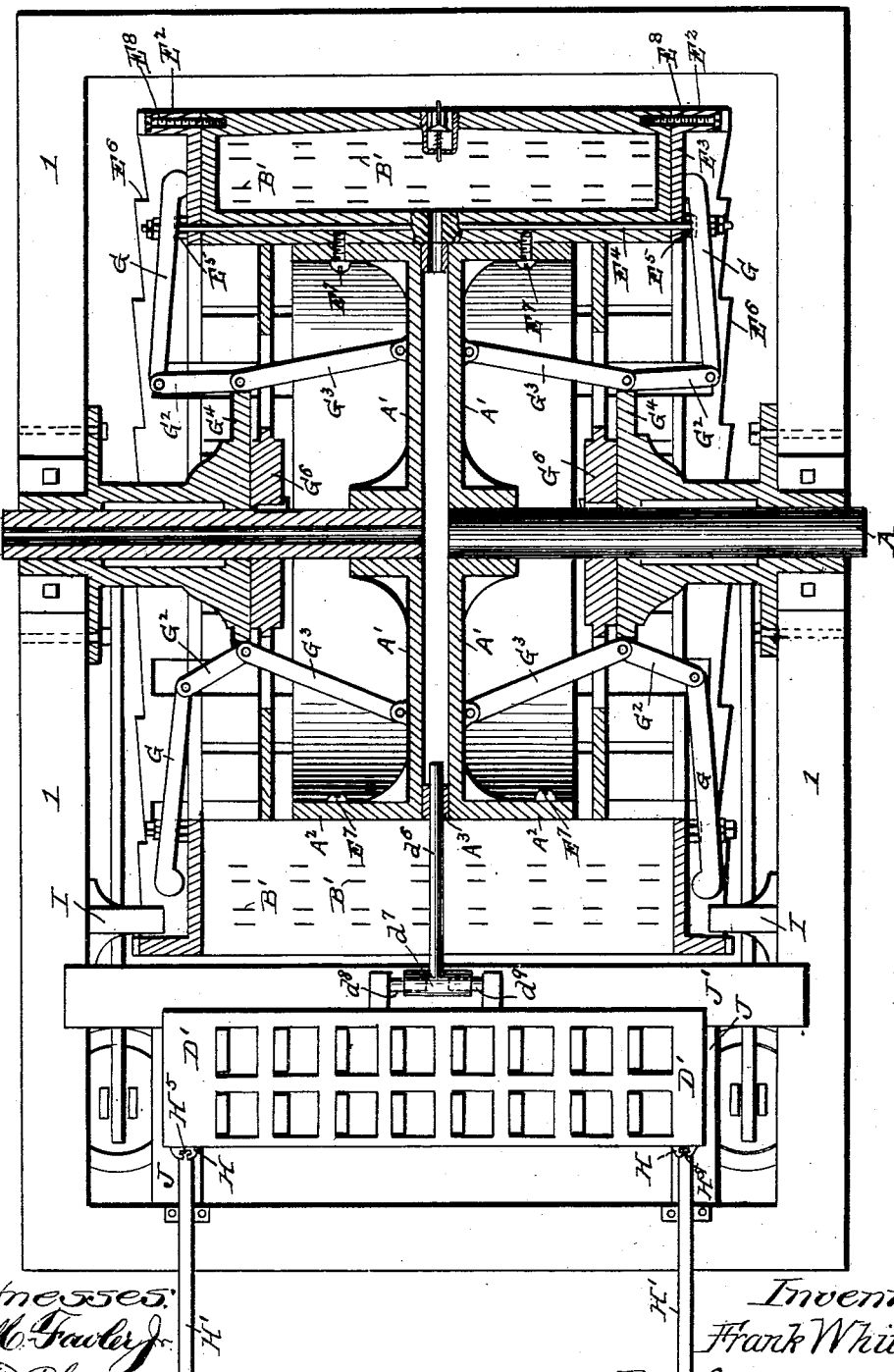

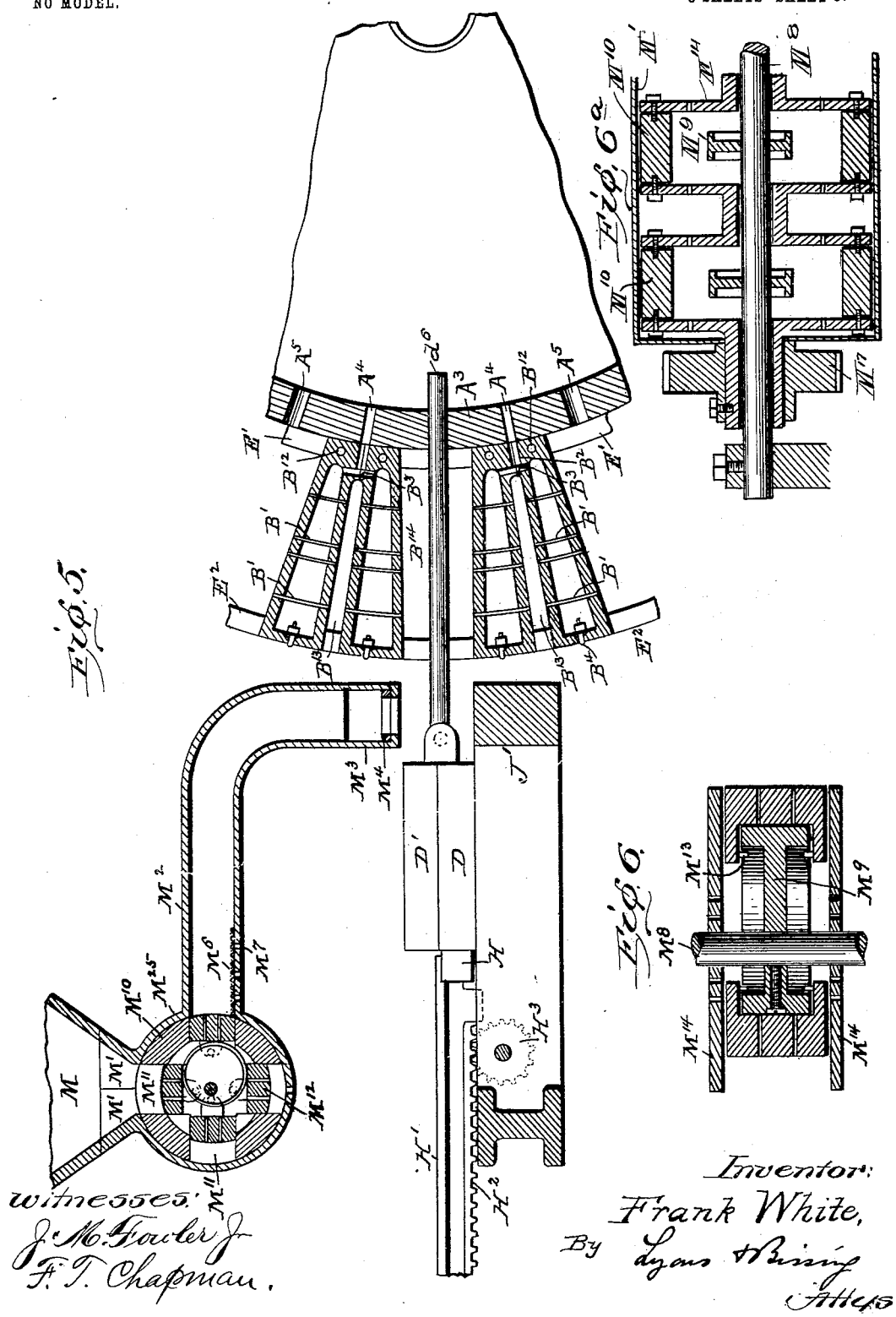

No. 738,090. PATENTED SEPT. 1, 1903.
F. WHITE.
APPARATUS FOR COMPRESSING AND DRYING PEAT INTO BLOCKS OF PEAT.
APPLICATION FILED JULY 3, 1902.
NO MODEL. 8 SHEETS—SHEET 6.
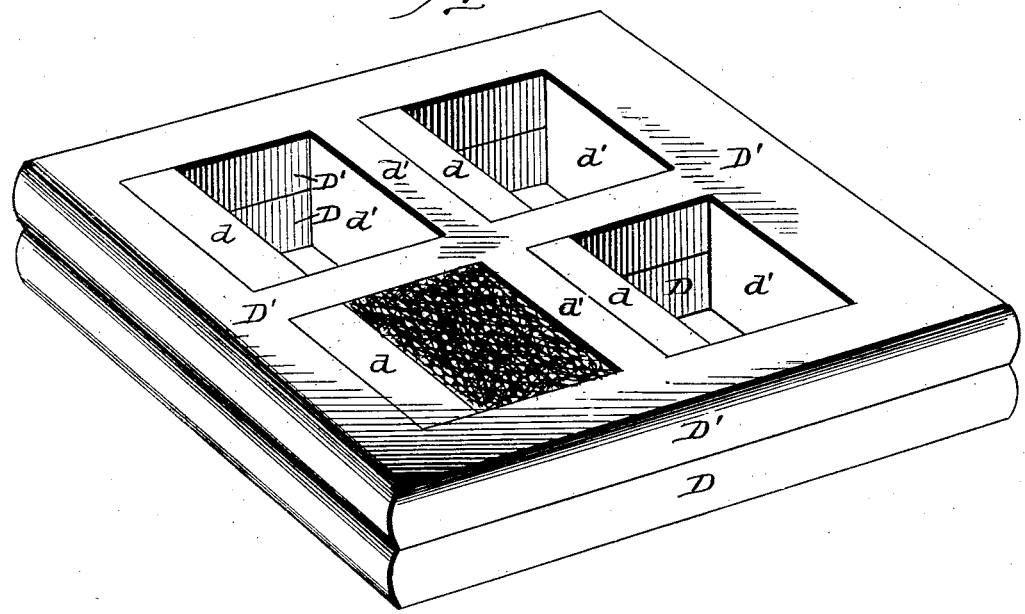
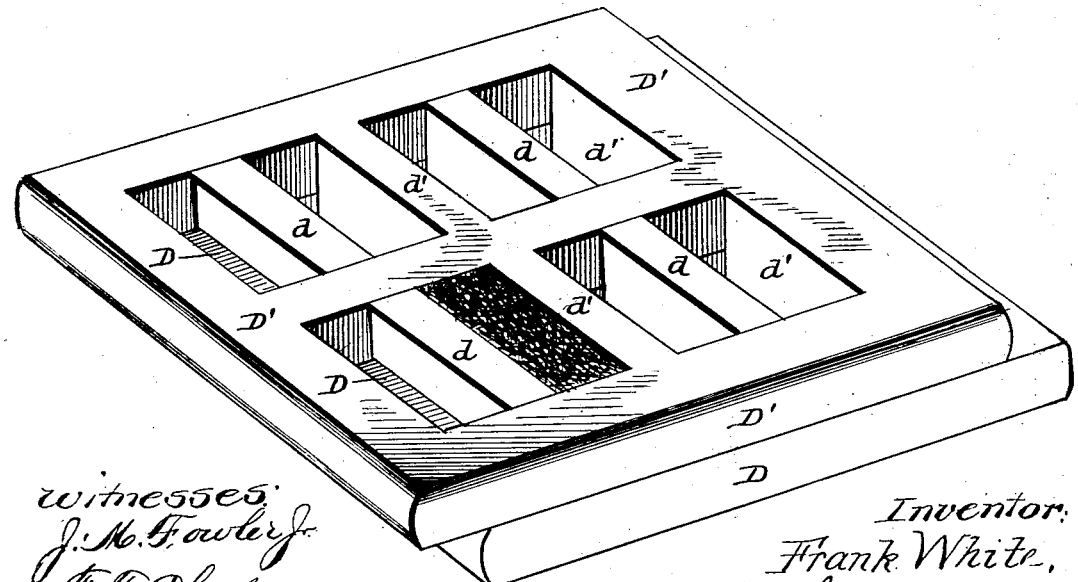

No. 738,090. PATENTED SEPT. 1, 1903.
F. WHITE.
APPARATUS FOR COMPRESSING AND DRYING PEAT INTO BLOCKS OF PEAT.
APPLICATION FILED JULY 3, 1902.
NO MODEL. 8 SHEETS—SHEET 7.

Witnesses:
J. M. Fowler Jr.
F. T. Chapman

Inventor:
Frank White,
By Lyons & Rising
Attys.

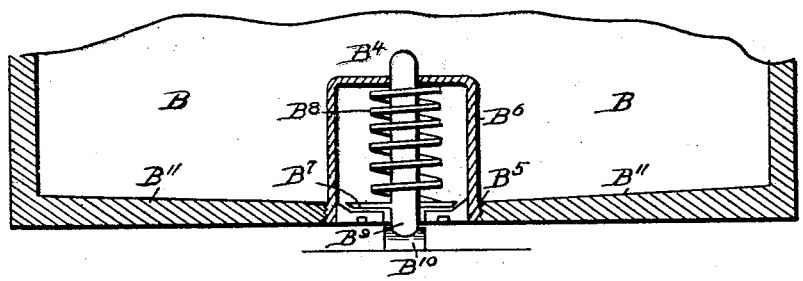
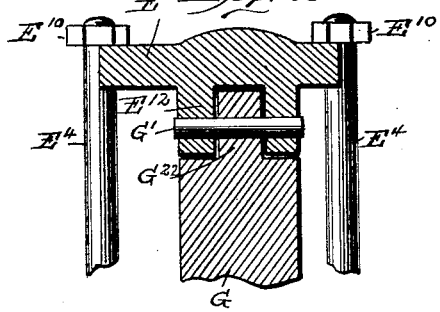
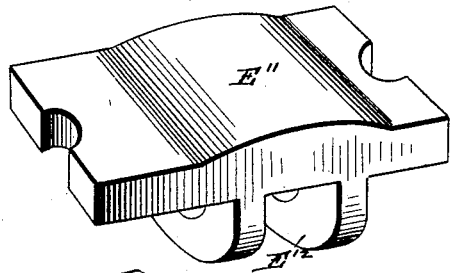
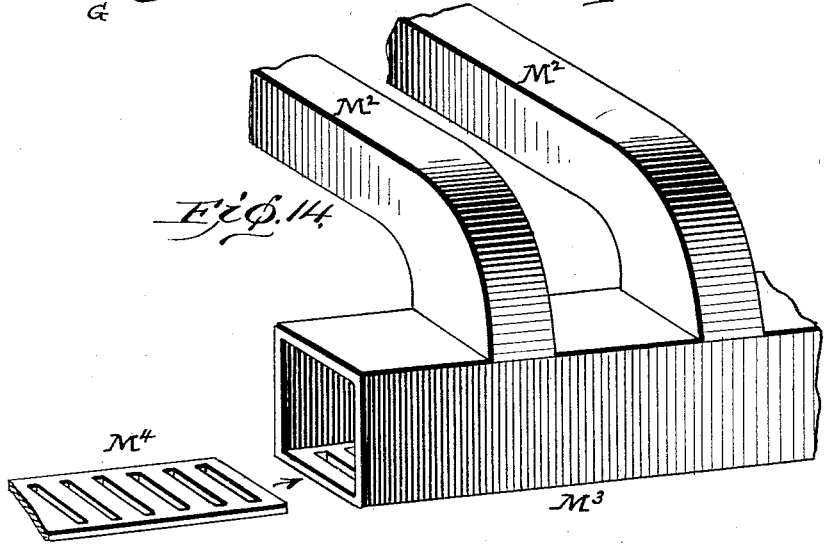

No. 738,090. Patented September 1, 1903.

UNITED STATES PATENT OFFICE.

FRANK WHITE, OF TORONTO, CANADA, ASSIGNOR, BY DIRECT AND MESNE ASSIGNMENTS, TO HIMSELF, AND GEORGE ALEXANDER GRIFFIN, OF GUELPH, ONTARIO, CANADA.

APPARATUS FOR COMPRESSING AND DRYING PEAT INTO BLOCKS OF PEAT.

SPECIFICATION forming part of Letters Patent No. 738,090, dated September 1, 1903.

Application filed July 3, 1902. Serial No. 114,294. (No model.)

*To all whom it may concern:*

Be it known that I, FRANK WHITE, a citizen of the Dominion of Canada, and a resident of Toronto, Province of Ontario, Dominion of Canada, have invented certain new and useful Improvements in Apparatus for Compressing and Drying Peat into Blocks of Peat, of which the following is a specification.

The object of my invention is to devise an apparatus which is especially designed to carry out on a large scale the process for manufacturing peat into blocks, which is set forth in an application for patent filed by me on June 28, 1902, under Serial No. 113,618. This process may here be briefly outlined. Peat as it comes from the bog, with as much water drained therefrom as will naturally flow off, is put into an inclosed and drained mold, which has been heated to about 300° or 350° Fahrenheit and which remains at this temperature throughout the operation. Immediately after the peat has been placed in the mold it is subjected to a slight pressure—say of about ten pounds to the square inch—which has the effect of driving the surface layers of the peat into contact with the heated mold-walls and against the drainage-apertures therein. The peat fibers which lie against or over the drainage-apertures thereby have their water-cells ruptured by the heat of the mold-walls and the contained water set free, so that they are in condition to form and do form, as practice shows, an efficient screen or matte. This matte is of such a character that it will not permit any substantial quantity of peat to escape through the drainage-apertures during the subsequent operation. At the same time it is permeable for moisture or steam. The utility of the matte lies in the fact that it permits the moisture or steam from the interior of the peat charge to escape through it in the subsequent stages of the operation and that it prevents the peat fiber itself or any material quantity thereof from so escaping. The initial slight pressure of, say, ten pounds to the square inch is applied for a period ranging from one minute to five minutes. During this time the matte, as I have found, is sufficiently formed to carry out the useful functions which I have ascribed to it in the further stages of the process. The formation of the matte having been carried to this point, the second stage of the process now begins by increasing the applied pressure upon the peat charge in the mold stepwise or in jumps. The wet peat charge in the mold which is subjected to this stepwise increasing pressure is, as before indicated, also subjected to the continuing action of heat at about the temperature stated. To fix ideas, I may say that the process under description may be efficiently practiced by increasing the pressure in the second stage of the process ten pounds at each step and by allowing an interval of a minute between each step. The second stage of the process may extend over a period of twenty-five minutes. At the beginning of the first minute we have the initial pressure of ten pounds to the square inch, at the beginning of the second minute we have a total pressure of twenty pounds to the square inch, at the beginning of the third minute the pressure will be thirty pounds to the square inch, and at the beginning of the twenty-fifth minute the pressure will have reached its maximum of two hundred and fifty pounds to the square inch. During this second stage of the process the peat charge in the mold is being gradually dried and compressed into a dense block having about the commercial percentage of moisture, and the matte is being gradually converted into a hard tarry jacket, which completely surrounds the block and which is intersected at predetermined points by more permeable porous sections corresponding in shape and location to the drainage-apertures. Further, moisture in the block or any gas which may be generated in the block during combustion will find ready escape through these porous sections. All this has been described in my application for Letters Patent for the peat block, which has been filed on June 28 under Serial No. 113,619. In the third stage of the process, which covers a few minutes of time, the applied pressure is not increased. Since, however, the application of heat is continued during this period and the contained block is in consequence shrinking away from the mold-walls, it will be seen that the actual pressure on the block runs down from the maximum of about two hundred and fifty pounds to the square inch which existed at the end of the second stage of the process. It is the idea of the process to let this pressure run down from two hundred and fifty to somewhere near seventy-five pounds to the square inch. This gradual diminution in pressure prevents any rupture of the tarry jacket which has been formed around the block. When the pressure at the end of the third stage of the process has been reduced to about the amount stated, the block is ready to be taken from the molds and is, in fact, ready for use, although further air-drying is not excluded.

I repeat, then, that the object of my present invention is to devise an apparatus which shall be able to carry out the process thus briefly outlined on a large scale. Since, however, the process requires that each block shall be treated in a separate mold-cavity, it follows that my apparatus must be capable of handling a large number of mold-cavities simultaneously. To this end I employ a traveling carrier for moving a series of inclosed and drained molds which are connected thereto. At the same time it is to be understood that when my machine is to be utilized for compressing and drying substances other than peat these drains may sometimes be dispensed with. In the embodiment of the invention hereinafter shown the carrier consists of a rotary drum. Each mold of the series of molds is provided with a heater to dry the charge. While this heater may take different forms, I much prefer heaters in the shape of heat-jacketed or steam tables, which form the top and bottom of the molds, respectively, the side walls of the molds being formed with heat or steam jackets with the same end in view. Compression devices are used in such a manner that each mold of the series of molds is kept under a continuous pressure, which increases stepwise or in jumps as the mold-carrier travels. The arrangement is such that there is a minimum of pressure at that point in the travel of the carrier which corresponds to a freshly-charged mold and that there is a maximum of pressure at that point in the carrier's travel which is a few steps removed from the point of discharge. While these compression devices may take various forms, I have shown levers mounted on the carrier in juxtaposition to the molds. These levers are hinged to toggle-joints, which coöperate with stationary cams in such a manner that the rotation of the carrier and the levers carried thereby causes the toggle-joints to be straightened by the stationary cams, and thus causes the levers to exert pressure upon the molds.

While my invention, broadly considered, is not limited to any specific type of mold, I yet much prefer to use a mold the construction of which I shall now indicate, because of its adaptability for the treatment of a large number of charges—that is to say, I make each mold of a series of molds around the carrier to consist of a nest of a number of mold cavities or compartments, so that if I have sixty-four molds in series around my carrier each mold of the series may consist of a nest of, say, sixty-four mold cavities or compartments, and I may thus treat in my apparatus four thousand and ninety-six peat blocks simultaneously.

Indicating now the construction of mold which I prefer to use, I may say that each mold of the series around the carrier comprises a pair of frames sliding upon each other and sliding between an upper and lower heat-jacketed or steam table, which two tables form the top and bottom of the mold, respectively. The sliding frames are divided into mold cavities or compartments, a separate compartment being used for each peat block. In the case above indicated there are sixty-four compartments in each frame, containing sixty-four separate peat blocks. Nominating as the fronts and backs of the compartments, those faces which move toward each other when the mold-frames slide upon each other I so construct the frames that the fronts, say, of all the compartments of the nest shall be constituted by projections extending upwardly from the lower frame, and the backs of all the compartments of the nest shall be constituted by projections extending downwardly from the upper frame. It will thus be seen that by sliding the frames with reference to each other, under the application of end pressure through the levers before described, the compartments of the nest which contain separate peat charges are reduced in size, and the peat in each separate charge is thereby placed under compression.

The charging device which I prefer to use in order to feed peat into the nest of compartments constituting a mold may be generally described as consisting of a longitudinal hopper communicating with a longitudinally-arranged series of rotary pockets. The bottoms of the pockets are formed as pistons, which lie in their lowermost position when peat is being taken into the pockets from the hopper and which on the rotation of the pockets are forced outwardly by cam devices in order to press the peat contained in the pockets into a longitudinally-arranged set of tubes. These tubes in turn communicate with a common cross-tube at their other ends, removed from the pockets. The bottom of this cross-tube is apertured, and the apertures are normally closed by a sliding grid. By this construction the cross-tube is kept full of peat under some pressure, and in order to fill a mold the mold is placed in position under the cross-tube and the sliding grid is pulled out, so that the apertures in the bottom of the cross-tube may be uncovered.

It will now be understood that a mold, comprising a number of mold cavities or compartments, is charged with peat and that the mold is pushed into place on the mold-carrier. This mold-carrier traveling stepwise, with an interval of, say, a minute between each step, the compression devices, in the shape of levers actuated by toggle-joints, push the two mold-frames which constitute the mold, so as to slide these frames upon each other, and thereby decrease the size of the mold-cavities and exercise pressure upon the peat charges contained therein. At every step of the mold-carrier there is a somewhat sudden increase of pressure upon the mold under consideration until a few steps before the mold is to be discharged. During the last few steps of the travel of the carrier the cam which acts on the toggle-joints is so arranged as to first give no increase of pressure and to then decrease the applied pressure, so that the molds may be discharged. During the entire time that the mold is on the carrier it is subjected to heat at appropriate temperatures, so that the peat is being dried and compressed simultaneously. The moisture from the peat escapes first in the shape of water and thereafter in the shape of steam through drainage-apertures, which are provided in the faces of the parts bounding the mold-cavities. In order that the molds may be discharged, the two sliding frames constituting the side walls of the mold-cavities are first pressed in a direction opposite to that of compression by stationary inclines on the machine-frame, and they are thereupon drawn out of the carrier by appropriate mechanism and discharged, only to be immediately recharged and pushed back on the mold-carrier to repeat the cycle.

In order that my invention may be more clearly understood, I proceed to describe the most efficient embodiment of it now known to me and which I have shown in the drawings.

Figure 10:
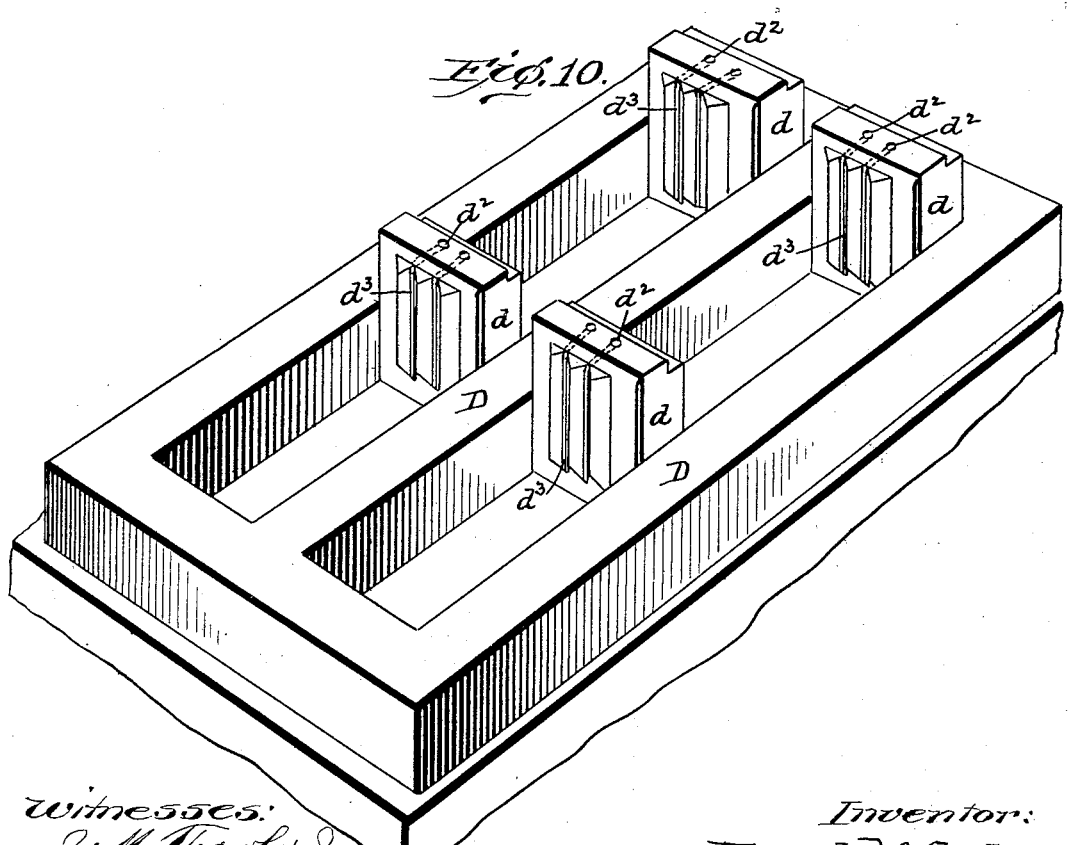

In the drawings, Figure 1 is a perspective view of the entire machine. Fig. 2 is a plan thereof. Fig. 3 is a side elevation thereof. Fig. 4 is a horizontal central section of the machine, showing only two sets of compression-levers. Fig. 5 is a vertical central section of the machine, showing a sector of the rotary drum and the charger. Figs. 6 and 6ª show cross-sections of the charging devices. Figs. 7 and 8 are details of the pair of mold-frames diagrammatically indicated. Fig. 9 is a vertical central section of a pair of mold-frames and the steam-tables coöperating therewith. Fig. 10 is a perspective view of one of the pair of mold-frames as actually constructed. Fig. 11 is a detail of the drainage-valve in the steam-table. Fig. 12 is a detail of the fulcrum for the compression-lever. Fig. 13 is a detail of the cap-plate for this fulcrum, and Fig. 14 is a perspective of the cross-tube of the charger.

My machine comprises the usual frame 1 with its standards and supports for the central shaft A, which in Fig. 4 is shown as made in two halves or parts. One of these parts is shown as hollow for the passage of steam or hot air. Rigidly secured to or cast integral with each half of the shaft A is a disk $A'$, having a flange $A^2$, the pair of disks $A'$ $A'$ being spaced apart by an annulus $A^3$, to which annulus the two disks are secured in a steam-tight fashion in any convenient manner. These disks $A'$ $A'$ and the annulus $A^3$ constitute a steam chest or reservoir, into which steam is fed through the hollow shaft A when the apparatus, as I prefer, and as is shown in the drawings, is heated by the use of steam. At the same time it is to be understood that my apparatus is readily adapted to be heated by other heating agency. The steam-chest thus described, taken in connection with the flanges $A^2$, forms a convenient carrier and one which I prefer to employ for the series of steam-tables and mold-frames, which I shall proceed to describe. At the same time it will be readily understood that this is but one of a number of types of carriers which may be used.

Coming, then, to a description of the steam-tables, it may be said that these several steam-tables are all similar in construction and that it will be sufficient to fully describe one of them. Referring to Fig. 5, there is shown a central cross-section of four of these steam-tables B. Each table is cast hollow to constitute a steam-space on the inside. Each table is furthermore cast with an abutment $B^3$, through which runs a set of apertures $B^2$, communicating with an aperture $A^4$ in the annulus $A^3$ of the steam-chest. The steam-table is also cast solid at the end next the steam-chest, and a longitudinal perforation $B^{12}$, parallel to the machine-axis, passes through this solid portion to receive a bolt to clamp the steam-table to two annular wheels or spiders on each side of the machine, which will be described farther on. At the side removed from the steam-chest the steam-table is provided with a drainage-valve $B^4$, which is better shown in Fig. 11, to which I now refer. Fig. 11 shows this drainage-valve on a large scale, and it also shows that part of the steam-table which is farthest removed from the axis of the machine when the steam-table is in place. It will be noticed that the bottom $B^{11}$ of this table is cast with an incline, so that the interior of the table drains toward the center, where the drainage-valve is situated. The drainage-valve $B^4$ may be of any common form and, as shown, consists of a screw-ring $B^5$, carrying a U-bracket $B^6$, which acts as a support or center for the sliding valve-stem. The valve $B^7$ on this stem is pressed against its seat by a helical spring $B^8$. When the steam-table in its rotation upon the axis A reaches its lowermost position, an extension $B^9$ from the valve-stem strikes a stationary abutment $B^{10}$ to raise the valve from off its seat, thereby opening the valve and allowing any water which may have accumulated in the steam-table to run off.

Cast integral with each steam-table are a series of drainage-tubes $B'$. (Indicated in section in Fig. 5 and shown in side elevation in Fig. 9.) These drainage-tubes may consist of separate tubes about which the metal of the table is cast or they may be cast in one piece with the metal of the tables. In either case their function is to allow water or steam from mold-spaces, which will be subsequently described, to pass from one side of the steam-table to its other side without permitting the steam which circulates in the hollow steam-table to get into the drainage-tubes and through them to the mold-cavities.

The manner of assembling the steam-tables upon the steam-chest or carrier may now be described. Examining Fig. 5, we see that two of these steam-tables—the one above and the one below the central horizontal line—constitute a mold-space $B^{14}$, in which mold-frames will be supported. Between each steam-table, bounding a mold-space $B^{14}$ and the steam-table adjoining it in the circular series on the side opposite the mold-space, there is a drainage-space $B^{13}$—that is to say, the steam-tables are assembled upon the carrier in pairs, of which adjacent pairs are considered as bounding or forming a mold-space $B^{14}$. Between the adjacent members of these pairs of steam-tables are formed drainage-spaces $B^{13}$. This is well shown in the plan view of Fig. 2, where the mold-spaces $B^{14}$ and the drainage-spaces $B^{13}$ are seen to alternate.

It will now be readily understood that steam from the steam-chest passes through the apertures $A^4$ $B^2$ into the interior of the steam-tables and serves to heat them to any desired degree—say to a temperature of 350° Fahrenheit. The water of condensation of the steam escapes through the drain-valve $B^4$, once in every rotation of the carrier, at the time when the steam-table is in its lowermost position. Any water or steam which comes from the mold-spaces $B^{14}$ passes through the drainage-tubes $B'$ into the drainage-spaces $B^{13}$ and escapes.

Should it not be desired to drain the mold, and should, therefore, the drainage-tubes $B'$ be dispensed with, it is clear that the drainage-spaces $B^{13}$ will be dispensed with. This means that the two steam-tables now shown on the opposite sides of the drainage-space $B^{13}$ will be formed as one. It is also clear that if an electric heater should be used instead of steam or hot air the construction which I have shown for the steam-table will be applicable. It is merely to be understood that the electric heater will be placed in the hollow space now supposed to be occupied by steam and that the electric wires will pass through the ports $B^2$ $A^4$, now utilized for the passage of steam. As a matter of terminology, I wish to say that I refer to these hollow tables and to other similar parts as "heat-jacketed" when I mean that they have a jacket constituting a hollow space which is usable for any desired heating means. I refer to the tables and similar parts as "steam-jacketed" when I mean to convey the idea that steam is used in connection therewith for heating the tables. When I use the word "table" without qualification, I intend a broad or generic meaning to include structures not jacketed.

In order to securely hold the steam-tables in position, I use a pair of annular wheels or spiders E, (well shown in Figs. 2 and 4,) each composed of an inner ring $E'$, an outer ring $E^2$, and connecting spokes $E^3$. These two spiders are concentric with the axis of the machine. The steam-tables, when a rotary carrier is used, are placed circumferentially around the carrier, but in a radial position with reference thereto. This is shown in Figs. 2, 3, and 5. The inner faces of the rings and spokes of the two spiders E press against the end faces of the steam-tables B, as is well shown in Fig. 2. Bolts $E^4$ pass through the rings $E'$ of the spiders E and through the longitudinal apertures $B^{12}$ of the steam-tables. Nuts $E^5$ on the bolts $E^4$ serve to clamp the two spiders and the steam-tables therebetween together. All this is well shown in Fig. 4. The outer ring $E^2$ of the spider E may be secured to the steam-table B by a cap-screw $E^8$, as shown in Fig. 4, or in any other suitable manner. It is thus seen that the steam-tables, spaced apart to form alternate mold-spaces and drainage-spaces, are rigidly secured into an annular or drum structure by means of the spiders E. This drum structure as a whole is supported upon the steam-chest and the flanges $A^2$, extending therefrom, in any suitable manner—as, for instance, by the screws $E^7$. (Shown in Fig. 4.)

I come now to a description of the mold-frames which, taken in connection with the steam-tables, form or bound the walls of the mold-cavities, it being understood that the steam-tables form the end walls and the mold-frames form the side walls of the mold-cavities. The principle of these mold-frames will be most readily understood from Figs. 7 and 8, which show them somewhat diagrammatically. There is a lower reticulated mold-frame D, having upwardly-extending projections $d$ and an upper reticulated mold-frame $D'$, having downwardly-extending projections $d'$. The projections $d'$ from the upper mold-frame extend into the lower mold-frame and the projections $d$ from the lower mold-frame extend into the upper mold-frame. These projections, as will be seen in a moment, form the approaching walls of the mold-cavities. In Fig. 7 the two mold-frames are shown as juxtaposed and the mold-cavities are shown of their maximum size. In Fig. 8 the mold-frames have been slid away from each other, and the size of the mold-cavities has been reduced by reason of the approach of the side walls of the mold-cavities formed by the projections $d$ $d'$. In order to displace the mold-frames from the position which they have in Fig. 7 into the position they occupy in Fig. 8, it is plainly sufficient to press the upper mold-frame to the left and the lower mold-frame to the right, as these parts are shown in Figs. 7 and 8. This sliding movement of the mold-frames upon each other is, in fact, brought about by a pair of compression-levers, which will be described later on, one of which acts against one mold-frame and the other of which acts against the other mold-frame. A careful examination of Fig. 8 reveals the fact that the mold-frames are capable of use in another manner by utilizing, as mold-cavities, the spaces to the left of those spaces which now constitute the mold-cavities. When so used, it will manifestly be necessary, in order to effect compression, to push the frames toward each other, so as to tend to make them occupy the position shown in Fig. 7.

The actual construction of mold-frame which I employ is shown in perspective in Fig. 10. Here the longitudinal part of the reticulation of the mold is formed by a longitudinal bar and the transverse part of the reticulation is formed by a series of blocks which constitute the projections that extend into the upper mold-frame. These projections $d$ are hollow and, as shown, carry wedge-shaped raised portions on that one of their faces which forms the approaching face of the mold-cavity. There are drainage-slots $d^3$ between these wedge-shaped projections, which drainage-slots communicate with the longitudinal tubes $d^2$. Fig. 9 shows a cross-section of a pair of these mold-frames superposed upon each other and sliding between a pair of steam-tables. The two mold-cavities are indicated by pairs of approaching arrows. It will be noticed that the projections $d$ are made hollow, being heat-jacketed or steam-jacketed, as the case may be. The same remark also applies to the mold-frames D D', it being understood that steam or other heating medium is allowed to freely circulate through the lower mold-frame and the projections which are rigidly connected therewith and that a similar remark applies to the upper mold-frame and its projections. Assuming now that moist peat has been placed in the mold-cavities when they occupy the position indicated in Fig. 7 and that heat is applied by means of the heat-jacketed mold-frames and the heat-jacketed tables, and assuming, furthermore, that pressure is applied to slide the mold-frames with reference to each other to decrease the size of the mold-cavities, it will be plain that the water in the peat will find its escape through the drainage-slots $d^3$ and also through the drainage-slots $d^4$, which are formed by the faces of the mold-frames sliding upon each other and sliding against the surface of the steam-table. Such moisture from the peat as reaches the surface of the steam-table is allowed to escape through the drainage-tubes B'.

In Figs. 7 and 10 I have shown four mold-cavities as constituted by my mold-frames. In Fig. 4 I have shown sixteen of such mold-cavities. In practice I would use a much larger number—say sixty-four—arranged in four rows of sixteen each. In fact, one of the great advantages of this type of mold is the facility with which it adapts itself for use with a large number of mold-cavities. Another advantage of this type of mold lies in the ease with which it can be supplied with steam or other heating medium. While the type of mold under description is not well adapted for a very heavy pressure, it is particularly suitable for the comparatively light pressures which are needed by me in the execution of my process above outlined. Finally, since the mold-cavities are discharged in a direction at right angles to that of compression it is plain that the molds can be placed into condition for discharge with the minimum amount of useless motion of the parts.

Before leaving the description of this mold I refer to Fig. 4, where I have shown the means for supplying steam to the hollow spaces of the mold-frames from the steam-chest. To this end I supply an extensible steam connection (shown as a tube $d^6$) moving in an aperture in the annulus $A^3$ and constituting a slip-joint therewith. This tube $d^6$ is rigidly secured to a collar or sleeve $d^7$, which forms a slip-joint with the two tubes $d^8$ $d^9$, the tube $d^8$ being rigidly secured to and communicating with the interior of one of the mold-frames and the tube $d^9$ being rigidly secured to and communicating with the interior of the other mold-frame. So long as the mold-frames are lying between the steam-tables the tube $d^6$ extends well toward the center of the steam-chest; but in order to discharge and recharge the mold-frames it is necessary, as will more fully appear farther on, to move the mold-frame with reference to the steam-table or rotary carrier, and in the present embodiment of my invention this motion takes place in a radial direction—that is, toward the left in Fig. 4. The extensible steam connection permits the mold-frames to be supplied with steam or other heating means when in position for discharge and recharge, and thus enables me to keep my molds quite as hot when they are being charged as when they are under compression. This is an important matter, since it is desirable in my process to feed peat into hot molds, which facilitates the production of the matte of peat fiber over the drainage-apertures.

I have now described the steam-chest, which is supported on the central shaft, the steam-tables, the spiders which hold them in proper position, and the construction of mold-frames which I prefer to employ in the mold-spaces between the tables. It is now necessary to tell how I rotate this carrier or structure upon its axis. To this end I form the ring $E^2$ of the spider E with as many ratchet-teeth $E^6$ as there are mold-spaces between the steam-tables. These ratchet-teeth $E^6$ are shown in Figs. 2 and 4 and in side elevation in Fig. 3. Coöperating with the ratchet-teeth $E^6$ are levers F, which may carry pawls to coöperate with the ratchet-teeth. The levers F are pivoted to links F', so that in the upward motions of the levers they may be allowed to move away from the center sufficiently to keep their pawls in engagement with the ratchet-teeth. To move these levers upwardly, and thereby rotate the carrier, I may employ a variety of devices; but I prefer a pair of hydraulic rams $F^2$, having pistons $F^3$. The cylinder of each ram is connected to a tube $F^4$. The two tubes $F^4$ are controlled by a valve $F^5$, moved by a lever $F^6$. It will readily be seen from Fig. 3 that when the parts are in the position shown the tube $F^4$ is in connection with the exhaust-pipe $F^7$ and the piston of the ram has descended. By pushing down the lever $F^6$ the tube $F^4$ is placed in communication with the pressure-pipe $F^8$ and the pistons will be raised an amount sufficient to rotate the carrier one step.

The compression devices are next to be described. As shown in the present embodiment of my invention they consist of sets of pairs of levers actuated by toggle-joints and cams. It will be remembered that the two mold-frames, constituting a pair, which lie in the mold-space between the tables are to be pressed apart. To this end I employ a pair of levers G G, one of these levers being mounted to press on one of the mold-frames and the other lever being mounted on the opposite side of the machine and being arranged to press on the other mold-frame. This is quite well shown in Figs. 3 and 4.

The manner of pivoting the levers G is shown in detail in Figs. 12 and 13. Here we find shown the stay-bolts $E^4$, which pass entirely through the machine from side to side and clamp the spiders against the steam-tables by a pair of nuts $E^5$. (Shown in Fig. 4.) The extreme ends of the rods $E^4$ are additionally threaded for the reception of a pair of nuts $E^{10}$, which hold in place a cap-plate $E^{11}$, having lugs $E^{12}$, which lugs are apertured for the passage of the pintle $G'$, which passes through the fulcrum $G^{22}$ of the lever G. By this construction it will be seen that the pair of levers G G, which act upon a pair of mold-frames, have the strain of their pressure applied to the opposite ends of that pair of stay-rods which pass through the two steam-tables adjoining the mold-space inclosing the mold-frame under consideration. The strain of the pressure is taken up by the stay-rods, which are well able to bear it.

Pivoted to the inner ends of the levers G are levers $G^2$, in turn pivoted to levers $G^3$ and constituting a toggle-joint. The inner ends of the levers $G^3$ are, in fact, pivoted to the side walls of the steam-chest. Coöperating with the toggle-joints thus formed is a pair of cams $G^4$. These cams $G^4$ are formed on a sleeve, which surround and form bearings for the central shaft A. The cam $G^4$ is shown in side elevation in Fig. 3, which gives a good idea of its outer or working face. As the steam-chest and with it the levers G are shown as rotating, it is clear that the cam must be stationary in order to apply a varying or regulable pressure upon the toggle-joints as these toggle-joints are rotated about the cam by the rotation of the steam-chest; but if the steam-chest and steam-tables for any of their uses were made stationary it is clear that the cam would have to be rotated.

It will now be clear that the hydraulic rams actuate the levers F to rotate the drum structure of my apparatus—that is, the structure carrying the steam-tables, compression-levers, and the like—one step at a time. Looking at Fig. 3 and beginning with the mold-space or compression-lever on the horizontal line to the left and assuming the drum structure to rotate clockwise, the working face of the cam $G^4$ may be so arranged as to apply a light and constant pressure at the start, which pressure is increased stepwise or in jumps upon each movement of the drum structure. The maximum pressure is applied a few steps before the position represented by the horizontal mold on the left is reached. At this point the working face of the cam is supposed to be circular, so as to keep the applied pressure constant. Upon further rotation the surface of the cam is so shaped as to suddenly remove the applied pressure. The sequence of pressures thus outlined is that particularly adapted for executing my process, above referred to, on peat. It gives a continuing and regulable pressure on each mold throughout the rotation of the carrier. At the same time it is to be understood that a different sequence of pressures might be employed when it is not intended to execute my process above referred to, but some other process for which the apparatus may be adapted. To this end the cams $G^4$ may be made removable and replaceable in any convenient manner.

In order to guide the levers $G^3$ and also to form a further support for the steam-tables in addition to that formed by the flanges $A^2$, I key upon the shaft A slotted disks $G^6$, (shown in Fig. 4,) it being understood that the levers $G^3$ move in and are guided by the lateral faces of the slots.

I may here also describe the manner in which I prevent the pairs of mold-frames from dropping out of the drum structure when these mold-frames in their rotation are situated below the shaft A. It will be noticed that the mold-frames lie in a radial direction with reference to the shaft, by which I mean that the edges of the mold-frames, as seen in the side elevation of Fig. 3, form radii of a circle having the shaft A as a center. As the mold-frames merely lie between the steam-tables, nothing so far described will prevent their dropping out of the drum structure when the radius just referred to points downwardly. To overcome this difficulty, I use a series of inwardly-projecting pairs of pins K, which are mounted on the ring $E^2$ opposite to the mold-spaces, all as shown in Fig. 2. The mold-frames opposite to these pins are provided with apertures registering with the pins. Now as the drum structure rotates the levers G gradually press the mold-frames apart, and thereby press the apertures in the mold-frames over the pins K. When then the mold-frames in the rotation of the drum come to lie in the lower half of the drum, they will be held from dropping out of the drum by the pins K taking into the apertures in the mold-frames, just described. When the pressure of the levers G upon the mold-frames has been released by the cut-away portion of the cam $G^4$, these mold-frames are in the position shown in Fig. 8. Before the finished peat block can be discharged from the mold-cavities it is necessary to push these two mold-frames toward each other into the position shown in Fig. 7. To this end I employ a pair of stationary inclines I. (Shown in Fig. 4.) These inclines are fastened to the machine-frame, and they are beveled off on their lower faces, so that as the mold-frames come between the two inclines I the two mold-frames are pushed toward each other, and the finished mold-block lies loosely in its mold-cavity, resting upon the mold-bottom, which is formed by the steam-table.

It will now be clear how the mold-frames coöperate with the steam-tables to subject the peat in the mold-cavities to a pressure which increases stepwise as the carrier rotates and to the action of a temperature which may be taken at 350° Fahrenheit, so that the peat which lies in the mold-cavities is gradually compressed and dried into blocks like those described and claimed in my application Serial No. 113,619, filed June 28, 1902. It is also clear how the mold-frames are finally pushed into the position shown in Fig. 7, with the finished peat blocks lying loosely in the mold-cavities and between the steam-tables.

I must now describe how the finished peat block is discharged from these mold-cavities and how the mold-cavities are recharged with peat. To this end the mold-frame is movable with reference to the carrier, and, as shown in Figs. 4 and 5, it is movable in a radial direction. One of the two mold-frames, as shown—the lower mold-frame D—is supplied with eyes H. This appears in Fig. 4. A pair of sliding bars H' is movable in a radial direction with reference to the drum structure by means of racks $H^2$ and pinions $H^3$, which pinions $H^3$ are secured to a shaft that is rotated by a hand-wheel $H^4$. (Shown in Fig. 1.) The eyes H are shown in position in plan in Fig. 2. Considering the two eyes shown at the left in Fig. 2, the motion of the carrier is such that these eyes move upwardly from below and engage hooks. (Shown in the form of T-heads $H^5$ upon the sliding bars H'.) It will thus be seen that the horizontal mold on the left in Fig. 2, say, has its eyes engaged by the hooks or T-heads $H^5$ on the sliding bars H'. By rotating the hand-wheel $H^4$ the pinions $H^3$ rotate the racks $H^2$ and slide the bars H' to the left to withdraw the mold-frames from the mold-carrier and to put them into position above the discharge-table J. The sliding bars H', with their T-heads and the eyes H, constitute withdrawing devices by which the mold is automatically engaged and thereupon withdrawn from its place on the carrier. When now the pair of mold-frames has been pulled out upon the discharge-table J, it will be found by examining Fig. 4 that the bottoms of the mold-cavities are all open below, so that the peat blocks can and do immediately drop out. In order to recharge these cavities, the hand-wheel, which controls the pinions $H^3$, is rotated, so as to push the first line of mold-cavities over the charging-table J', whereupon peat is fed into this line of mold-cavities from above in a manner which will be described later on. Thereupon the same hand-wheel is again rotated to bring the second line of mold-cavities above the charging-table J', whereupon the second line of mold-cavities is filled, and so on, in case any larger number of lines of mold-cavities are used. After the mold-cavities are filled the hand-wheel is still further rotated to push the pair of mold-frames into position in the mold-space $B^{14}$ between a pair of steam-tables. The carrier or drum being rotated, the hook H automatically disengages from the T-head $H^5$, leaving the latter in position to automatically engage the next pair of molds.

I must now describe the charging device which I prefer to employ by which peat is fed into the mold-cavities. This is best shown in Figs. 3, 5, and 14, as well as in the perspective view of Fig. 1. There is a hopper M and a two-part casing M'. One-half of the mold-casing M' is connected to a series of discharge-tubes $M^2$, and these in turn are connected at their other ends to a cross-tube $M^3$, which lies above the charging-table J'. The bottom of this cross-tube $M^3$ is slotted or provided with apertures, these apertures being normally closed by a grate $M^4$. To this grate $M^4$ is secured a rod and handle $M^5$, and by pulling out the rod the apertures in the bottom of the cross-tube $M^3$ are supposed to be opened to permit peat to be forced into those mold-cavities which are lying above the charging-table J'. At the same time it is to be understood that this slotted bottom and grate are merely one of a number of devices which may be used for the same purpose. I may also refer to the fact that a matting and grating $M^6$ is placed over apertures $M^7$ in the tubes $M^2$ near the ends at which peat is forced into the tube, the idea of this matting and grating and these apertures being, as well understood, to permit the escape of any excess moisture which may be able to escape in this manner.

Coming now more particularly to the description of the feeder of the charging device, it will be seen to consist of a stationary central shaft $M^8$, to which is rigidly secured a cam $M^9$. About this shaft is made to rotate in any convenient manner a sleeve $M^{10}$, having a series of pockets $M^{11}$. Apertured pistons $M^{12}$ move up and down in the pockets $M^{11}$. These pistons are pushed outwardly by the outer face of the cam $M^9$, and they are drawn inwardly by the fact that inwardly-extending pins $M^{13}$ on the pistons engage with the inner face of the cam $M^9$. The cam $M^9$ is therefore a double cam, its outer face serving to move the pistons $M^{12}$ outwardly and its inner face serving to move the pistons $M^{12}$ inwardly.

I have before remarked that the pistons $M^{12}$ are perforated. They are also covered with a matting, which it is unnecessary to show. The same remark applies to the faces $M^{14}$, which are shown in Fig. 6 as embracing the sides of the sleeve structure carrying the pockets $M^{11}$.

The above description will make clear the construction of a single set of four pockets and four pistons in a plane at right angles to the axis of the shaft $M^8$, as shown in Fig. 5. In order to understand how a number of sets of these pockets are strung longitudinally along the shaft $M^8$ and are connected together, we must refer to Fig. $6^a$, which shows a section taken in a plane passing through the shaft $M^8$ and making an angle of forty-five degrees with a vertical line. This Fig. $6^a$ shows the outer casing $M'$, the central shaft $M^8$, and the cams $M^9$ thereupon, which need no further description. The side plates $M^{14}$ are shown in the shape of spools which lie upon the shaft, adjacent spools being connected to each other and spaced apart by the sleeve $M^{10}$. The gear-wheel $M^{17}$ is keyed upon the end spool. It will thus be understood that when this gear $M^{17}$ revolves all the spools revolve and with them are revolved the sleeves $M^{10}$. These sleeves $M^{10}$ carry with them the pistons $M^{11}$, as shown in Fig. 5, and these pistons $M^{11}$ are moved outwardly and inwardly in radial lines by the stationary cams $M^9$.

As shown in Fig. 5, there is a set of four pockets and four pistons therein at a point corresponding to one of the tubes $M^2$. As I use a number of these tubes $M^2$, I use one set of pockets for each tube $M^2$. If I have eight tubes $M^2$, I will have a longitudinally-arranged series of eight sets of four pockets each and four pistons each in the casing below my hopper.

In order to hold the cross-tube $M^3$ and the tubes $M^2$ connected therewith in place, I employ a frame $M^{16}$, which is shown in Figs. 1 and 3.

In order to rotate the sleeve $M^{10}$, I secure thereto in any convenient manner a gear-wheel $M^{17}$, already described, meshing with a pinion $M^{18}$ on a shaft $M^{19}$, which shaft $M^{19}$ carries a pulley $M^{20}$, kept in constant rotation during the operation of the machine by a belt $M^{21}$. It will thus be seen that as moist peat is placed in the hopper M it falls down into an upwardly-extending pocket $M^{11}$. Rotation of the sleeve $M^{10}$ takes this pocket $M^{11}$ out of communication with the hopper and puts it opposite that portion of the casing which I have lettered $M^{25}$ in Fig. 5. It will thus be seen that the peat in the mold-pocket $M^{11}$ is cut off from the peat in the hopper and any small roots or the like which might find themselves partly in this pocket and partly in the hopper would be cut in two by this operation. As the pockets rotate still further some of the moisture of the peat contained therein is discharged through drainage-apertures in the piston $M^{12}$. When the piston $M^{12}$ reaches the tube $M^2$, the peat will be discharged into this tube by the action of the cam $M^9$. As the belt $M^{20}$ is constantly rotating, it is readily seen that the tubes $M^2$ and the cross-tube $M^3$ are kept filled with peat under some pressure, so that by sliding the grate $M^4$ by means of the handle $M^5$ peat is pressed through the apertures in the bottom of the cross-tube and uniformly into the mold-cavities therebeneath. At the same time the tubes $M^2$ are at all times cut off from any direct communication with the hopper, so that the peat which is under pressure in the tubes $M^2$ cannot be forced backward out of them and into the hopper. The structure acts as a check-valve in this respect.

I have thus far described the construction of my apparatus, and in describing each part I have naturally described its operation. It will now be well to describe the operation of the apparatus as a whole step by step and in the order of time.

Peat is placed in the hopper M, falls into the pockets $M^{11}$, and upon rotation of the sleeve $M^{10}$ is cut off from communication with the peat in the hopper and is ejected into the tubes $M^2$ under some pressure by means of the pistons $M^{12}$. During this operation some of the excess moisture of the peat is expressed through the drainage-apertures in the peat and in the tubes $M^2$. The result is that the tubes $M^2$ and the cross-tube $M^3$, connected therewith, are kept full of peat under some pressure. A pair of mold-frames are now slid over the charging-table $J'$ by the action of the hand-wheel $H^4$, the pinions $H^3$, the racks $H^2$, and the hooks and eyes H $H^5$. The mold-frames are placed in such position upon the charging-table $J'$ that one line of mold-cavities is immediately over this charging-table, so that the upper surface of the charging-table forms the bottom of this line of mold-cavities. The handle $M^5$, attached to the grate $M^4$, is then pulled out, so as to uncover the slots in the bottom of the cross-tube $M^3$, whereupon the line of mold-cavities is filled with peat. The hand-wheel $H^4$ is now rotated to bring a second line of mold-cavities under the cross-tube $M^3$, the grate is again operated, and the second line of mold-cavities is filled with peat. This operation is repeated as often as necessary to fill each line of mold-cavities. Further rotation of the hand-wheel $H^4$ now causes the mold-frames D $D'$ to pass into the mold-space $B^{14}$ on the drum structure. The operator thereupon pushes down the lever $F^6$ of the valve connected to the hydraulic rams, so as to place the pressure-tube F⁸ into communication with the tubes F⁴, leading to the rams. This has for its result to raise the pistons F³ and the levers F. The levers F, acting against the ratchets E⁶, turn the drum structure one step. Another pair of molds is now charged, as before, and put back into its mold-space. The drum structure is thereupon rotated another step, and so on. Fixing our attention upon the pair of mold-frames first introduced we find that their contents are subjected to an increasing pressure by the action of the cams G⁴ upon the toggle-joints constituted by the levers G² G³. This serves to press opposite pairs of levers G—one upon one mold-frame and the other upon the other mold-frame of a pair of mold-frames. The levers G thus push the pair of mold-frames from the position of Fig. 7 to the position of Fig. 8, thus compressing the peat in the mold-cavities. During all this time steam is passing from the steam-chest through the ports A⁴ into the steam-tables and through the tube $d^6$ around the mold-cavities. This means that the peat is being dried as well as compressed. The moisture from the peat escapes first in the form of water and then in the form of steam between the joints $d^4$ (shown in Fig. 9) and through the drainage-tubes B'. (Shown in Fig. 9 and Fig. 4.) When the mold-frame under consideration has been carried through three-fourths or more of its rotation, the cam G⁴ is so arranged as not to increase the applied pressure. The peat block being, however, still under the influence of the heat of the steam in the steam-tables and in the hollow mold-frames continues to dry and to shrink, so that the pressure upon the block rapidly decreases of its own accord. This automatic decrease of pressure on the peat block by failure to increase the applied pressure through the levers G is permitted to take place during a period of time represented by several steps in the rotation of the carrier. The applied pressure is now suddenly removed by reason of the fact that the toggle-joints have reached the cut-away portions of the cams G⁴. At this point the pair of mold-frames under consideration are just below the horizontal radius to the left in Fig. 3, indicating the position of charge. The mold-frames in the mold-spaces B¹⁴ of the drum structure are in the position indicated in Fig. 8. It is necessary to bring them into the position shown in Fig. 7—that is to say, to slide the two mold-frames toward each other in order that the mold-cavities may be further opened for the subsequent dropping out of the finished peat blocks. This result is effected, as has already been described, by having the pair of mold-frames pass between a pair of stationary inclines I I. (Shown in Figs. 2 and 4.) These inclines, one on each side of the machine, acting against the mold-frames in their extended positions of Fig. 8 drive them into their juxtaposed position of Fig. 7. The further rotation of the carrier brings the pair of mold-frames under consideration into a horizontal position on the left in Fig. 3. At the same time the eyes H of the pair of mold-frames have come into automatic engagement with the hooks or T-heads H⁵ of the withdrawing devices H' H'. As before explained, the eyes have moved up from below and have slipped onto and over the T-heads H⁵. The operator therefore turns the hand-wheel H⁴, actuates the withdrawing device, pulls the pairs of mold-frames from the mold-space of the drum structure, pulls these mold-frames beyond the charging-table J' and onto the bottomless discharging-table J, at which place the peat blocks immediately drop out of the mold-cavities. The mold-frames are then run back onto the charging-table J' and the operation is repeated.

I have not considered it necessary to repeat that the steam-tables are drained when in their lowermost position by reason of the fact that their drainage-valves are opened by the stationary abutments B¹⁰ acting against the valve-stem B⁹, as shown in Fig. 11.

This completes the description of my apparatus. I may add that while I have shown a mere handle M⁵ for operating the grate which controls the discharge of peat into the mold-cavities it is manifest that power devices might be utilized for this purpose. It is equally plain that although I have described this machine as under the charge of an operator, who controls the valves for the hydraulic rams and the handle M⁵, these parts are well adapted to be operated in proper sequence by automatic mechanism. In fact, as I have before indicated, I consider these rams and this handle mere conventional mechanisms to indicate what is required.

It is manifest that I am not limited to the details of construction which I have attempted to carefully describe. I therefore desire to have it understood that my claims, except where specific mechanisms are expressly included, are to be read in a broad sense.

What I claim is—

1. An apparatus for compressing and drying peat into blocks comprising a traveling carrier which is movable stepwise, a series of inclosed molds, provided with heaters, connected to the carrier and movable with relation thereto for charging and discharging in the interval between the steps, and compression devices arranged to hold the series of molds under a regulable pressure during the travel of the carrier, substantially as described.

2. An apparatus for compressing and drying peat into blocks comprising a traveling carrier which is movable stepwise, a series of steam-jacketed, inclosed molds moved by the carrier and movable with relation thereto for charging and discharging in the interval between the steps; extensible steam connections for supplying steam to the mold-jackets continuously throughout the operation, and compression devices arranged to hold the series of molds under a regulable pressure during the travel of the carrier, substantially as described.

3. An apparatus for compressing and drying peat into blocks comprising a rotary carrier movable stepwise, a series of circumferentially-arranged inclosed molds rotated thereby and movable with reference to the carrier for charging and discharging in the interval between the steps, heaters for the molds and compression devices arranged to hold the series of molds under a regulable pressure during the rotation of the carrier, substantially as described.

4. An apparatus for compressing and drying peat into blocks comprising a rotary carrier movable stepwise, a series of circumferentially-arranged inclosed molds rotated thereby and radially movable in the interval between the steps with reference to the carrier for charging and discharging, heaters for the molds and compression devices arranged to hold the series of molds under a regulable pressure during the rotation of the carrier, substantially as described.

5. An apparatus for compressing and drying peat into blocks comprising a rotary carrier movable stepwise, a series of circumferentially-arranged inclosed heat-jacketed molds rotated thereby and movable in the interval between the steps with reference to the carrier for charging and discharging, and compression devices arranged to hold the series of molds under a regulable pressure during the rotation of the carrier, substantially as described.

6. An apparatus for compressing and drying peat into blocks comprising a rotary carrier movable stepwise, a series of circumferentially-arranged inclosed heat-jacketed molds rotated thereby and radially movable in the interval between the steps with reference to the carrier for charging and discharging, and compression devices arranged to hold the series of molds under a regulable pressure during the rotation of the carrier, substantially as described.

7. An apparatus for compressing and drying peat into blocks comprising a rotary carrier, a series of circumferentially-arranged inclosed steam-jacketed molds rotated thereby and movable with reference to the carrier for charging and discharging, extensible steam connections for supplying steam to the mold-jackets, and compression devices arranged to hold the series of molds under a regulable pressure during the travel of the carrier, substantially as described.

8. An apparatus for compressing and drying peat into blocks comprising a rotary carrier, a series of tables rotated thereby, mold-frames between adjacent pairs of tables, and compression devices arranged to hold the series of mold-frames thus constituted under a regulable pressure during the rotation of the carrier, substantially as described.

9. An apparatus for compressing and drying peat into blocks comprising a rotary carrier, a series of tables rotated thereby, pairs of sliding mold-frames between adjacent pairs of tables, and compression devices arranged to hold the series of mold-frames under a regulable pressure during the rotation of the carrier, substantially as described.

10. An apparatus for compressing and drying peat into blocks comprising a rotary carrier, a series of heat-jacketed tables rotated thereby, pairs of sliding heat-jacketed mold-frames between adjacent pairs of tables, and compression devices arranged to hold the series of mold-frames under a regulable pressure during the rotation of the carrier, substantially as described.

11. An apparatus for compressing and drying peat into blocks comprising a rotary carrier, a series of steam-tables rotated thereby, removable and replaceable steam-jacketed mold-frames between adjacent pairs of steam-tables, extensible steam connections for supplying steam to the mold-frames, and compression devices arranged to hold the series of mold-frames under a regulable pressure during the rotation of the carrier, substantially as described.

12. An apparatus for compressing and drying peat into blocks comprising a rotary steam-chest, a series of steam-tables connected therewith, steam-jacketed mold-frames between adjacent pairs of steam-tables, steam connections for supplying steam from the steam-chest to the steam-tables and mold-jackets, and compression devices arranged to hold the series of mold-frames under a regulable pressure during the rotation of the carrier, substantially as described.

13. An apparatus for compressing and drying peat into blocks comprising a rotary steam-chest, a series of steam-tables connected therewith, removable and replaceable steam-jacketed mold-frames between adjacent pairs of steam-tables, extensible and other steam connections for supplying steam from the steam-chest to the steam-tables and mold-jackets, and compression devices arranged to hold the series of mold-frames under a regulable pressure during the rotation of the carrier, substantially as described.

14. An apparatus for compressing and drying peat into blocks, comprising a circularly-arranged series of pairs of steam-tables having drainage-spaces between adjacent pairs and mold-spaces between the pairs, drainage-tubes passing through the steam-tables and a pair of sliding mold-frames in each mold-space arranged to have their contents drained through the drainage-tubes, substantially as described.

15. An apparatus for compressing and drying peat into blocks comprising a circularly-arranged series of pairs of steam-tables having drainage-spaces between adjacent pairs and mold-spaces between the pairs, drainage-tubes passing through the steam-tables, and a pair of steam-jacketed sliding mold-frames in each mold-space arranged to have their contents drained through the drainage-tubes, substantially as described.

16. An apparatus for compressing and drying peat into blocks comprising a circularly-arranged series of tables, pairs of sliding mold-frames between adjacent pairs of tables, a pair of levers for each pair of mold-frames, toggle-joints connected to the levers, and a cam or cams for subjecting the series of toggle-joints thus constituted and thereby the series of mold-frames to a regulable pressure, substantially as described.

17. An apparatus for compressing and drying peat into blocks comprising a rotary carrier, a circularly-arranged series of tables thereon, pairs of sliding molds between adjacent pairs of tables, a pair of levers for each pair of mold-frames, toggle-joints connected to the levers, and a stationary cam or cams for subjecting the series of toggle-joints thus constituted and thereby the series of mold-frames to a regulable pressure, substantially as described.

18. An apparatus for compressing and drying peat into blocks, comprising a circularly-arranged series of heat-jacketed tables, a pair of axially-sliding heat-jacketed mold-frames between adjacent pairs of tables, a pair of levers for each pair of mold-frames, toggle-joints connected to the levers, and a cam or cams for subjecting the series of toggle-joints thus constituted and thereby the series of mold-frames to a regulable pressure, substantially as described.

19. In an apparatus for compressing and drying peat into blocks, a rotary carrier, a circularly-arranged series of heat-jacketed tables connected thereto, a pair of sliding heat-jacketed mold-frames between adjacent pairs of tables, a pair of levers for each pair of mold-frames, toggle-joints connected to the levers at one end and to a part movable with the rotary carrier at the other end, and a stationary cam or cams for subjecting the series of toggle-joints thus constituted and thereby the series of mold-frames to a regulable pressure, substantially as described.

20. An apparatus for compressing and drying peat into blocks, comprising a rotary carrier, a circularly-arranged series of heat-jacketed tables connected thereto, a pair of sliding heat-jacketed mold-frames between adjacent pairs of tables, a pair of levers for each pair of mold-frames, toggle-joints connected to the levers at one end and to a part movable with the rotary carrier at the other end, and a stationary cam or cams arranged to subject the series of toggle-joints thus constituted and thereby the series of mold-frames to a pressure which increases stepwise until a predetermined point, then remains stationary and then decreases suddenly, substantially as described.

21. An apparatus for compressing and drying peat into blocks comprising a pair of annular spiders, a series of radially-arranged heat-jacketed tables mounted therebetween and secured thereto, and a pair of sliding mold-frames between adjacent pairs of tables, substantially as described.

22. An apparatus for compressing and drying peat into blocks for fuel comprising a pair of annular spiders provided with ratchet-teeth, a series of radially-arranged tables secured between the spiders and rotating on a central shaft, a pair of sliding mold-frames between adjacent pairs of tables and levers for coöperating with the ratchet-teeth to rotate the structure, substantially as described.

23. An apparatus for compressing and drying peat into blocks for fuel comprising a pair of annular spiders provided with ratchet-teeth, a series of radially-arranged heat-jacketed tables secured between the spiders and rotating on a central shaft, a pair of sliding mold-frames between adjacent pairs of tables, levers for coöperating with the ratchet-teeth, and hydraulic rams acting against the levers to rotate the structure, substantially as described.

24. An apparatus for compressing and drying peat into blocks for fuel comprising a central shaft, a steam-chest secured thereon, a series of radially-arranged steam-tables secured to the steam-chest and supplied with steam therefrom, a pair of sliding mold-frames between adjacent pairs of steam-tables and a pair of annular spiders secured to the opposite sides of the steam-tables and holding the structure together, substantially as described.

25. An apparatus for compressing and drying peat into blocks for fuel comprising a pair of annular spiders, a series of radially-arranged tables secured between the spiders, a pair of sliding mold-frames between adjacent pairs of tables, stay-bolts running from spider to spider to clamp the tables in place, and pivoted compression-levers on each spider having their pivots connected to the stay-bolts, substantially as described.

26. An apparatus for compressing and drying peat into blocks comprising a central shaft, a series of radially-arranged tables connected thereto, a pair of axially-sliding and radially removable and replaceable mold-frames between adjacent pairs of tables, and compression devices for axially sliding the mold-frames to subject their contents to a regulable pressure, substantially as described.

27. An apparatus for compressing and drying peat into blocks comprising a traveling carrier, a series of molds connected to the carrier and movable with relation thereto for charging and discharging, and a withdrawing device automatically engaging a mold during the travel of the carrier and movable to withdraw the same from the carrier, substantially as described.

28. An apparatus for compressing and drying peat into blocks comprising a traveling carrier moving stepwise, a series of molds connected to the carrier and movable with relation thereto for charging and discharging in the interval between the steps, and a withdrawing device automatically engaging a mold during the travel of the carrier and movable to withdraw the same from the carrier in the interval between the steps, substantially as described.

29. An apparatus for compressing and drying peat into blocks, comprising a central shaft, a series of radially-arranged tables connected thereto, a radially-movable mold between adjacent pairs of tables, and a withdrawing device movable in a radial line and automatically engaging the mold to withdraw the same from between a pair of tables for charging and discharging, substantially as described.

30. An apparatus for compressing and drying peat into blocks, comprising a central shaft, a series of radially-arranged tables connected thereto, a pair of axially-sliding and radially-movable mold-frames between adjacent pairs of tables, a withdrawing device movable in a radial line and automatically engaging a pair of mold-frames to withdraw the same from between a pair of tables for charging and discharging, and compression devices for axially sliding the mold-frames between the tables to subject their contents to a regulable pressure, substantially as described.

31. An apparatus for compressing and drying peat into blocks, comprising a central shaft, a series of radially-arranged tables connected thereto, a radially-movable mold between adjacent pairs of tables, an eye secured to the mold, and a bar sliding in a radial line and having a hook to automatically engage the eye to withdraw the mold from between the tables for charging and discharging, substantially as described.

32. An apparatus for compressing and drying peat into blocks, comprising a pair of annuli each carrying a series of inwardly-projecting pins, a series of pairs of mold-frames mounted between the annuli, sliding outwardly to effect compression and having apertures to engage the pins upon their outward motion, substantially as described.

33. An apparatus for compressing and drying peat into blocks, comprising a pair of annuli having a series of radially-arranged tables secured between them, a series of inwardly-projecting pins on each annulus between the tables, a series of pairs of mold-frames between the tables sliding outwardly to effect compression and having apertures to engage the pins upon their outward motions, substantially as described.

34. An apparatus for compressing and drying peat into blocks comprising a circularly-arranged series of pairs of mold-frames sliding away from each other to effect compression, and stationary abutments for pushing the mold-frames toward each other to release the charge, substantially as described.

35. An apparatus for compressing and drying peat into blocks, comprising a circularly-arranged series of tables mounted on a rotary shaft, a pair of mold-frames between adjacent tables, sliding away from each other to effect compression, and stationary abutments for pushing the mold-frames toward each other to release the charge, substantially as described.

36. An apparatus for compressing and drying peat into blocks comprising a circularly-arranged series of steam-tables mounted on a rotary carrier, drain-valves on the outer circumferential faces of the steam-table, and a stationary abutment acting against the movable part of a drain-valve to open the valve when in its lowermost position of travel to drain the apparatus, substantially as described.

37. An apparatus for compressing and drying peat into blocks comprising a rotary shaft, a steam-chest mounted thereon, a circularly-arranged series of steam-tables mounted on and communicating with the steam-chest, drain-valves on the outer circumferential faces of the steam-tables, and a stationary abutment acting against a movable part of the drain-valve to open the valve when in its lowermost position of travel to drain the apparatus, substantially as described.

38. A charger for peat-machines comprising a hopper, a rotary series of pockets taking peat from the hopper, radially-movable pistons in the pockets, and a tube into which the peat is discharged by the pistons, substantially as described.

39. A charger for peat-machines comprising a hopper, a rotary sleeve having a series of radial pockets, radially-movable pistons in the pockets, a stationary cam for thrusting the pistons outwardly, and a tube into which the peat is thus discharged by the pistons, substantially as described.

40. A charger for peat-machines comprising a hopper, a rotary sleeve having a series of radial pockets, radially-movable pistons in the pockets, a stationary cam having opposing surfaces for moving the pistons outwardly and inwardly respectively, and a tube into which the peat is discharged upon outward movement of the pistons, substantially as described.

41. A charger for peat-machines comprising a cylindrical casing connected to a hopper and to a discharge-tube respectively, a series of pockets rotating within the cylindrical casing and taking peat from the hopper, and radially-movable pistons in the pockets discharging the peat from the pockets into the discharge-tube, substantially as described.

42. A charger for peat-machines comprising a rotary series of pockets, radially-movable pistons in the pockets, and a tube communicating with the pockets, apertured near the pockets, and normally closed at its end removed from the pockets, whereby peat is discharged into the tube under pressure and some of its moisture is expelled through the apertures, substantially as described.

43. A charger for peat-machines comprising a rotary series of pockets, radially-movable apertured pistons in the pockets, and a tube communicating with the pockets, apertured near the pockets, and normally closed at its end removed from the pockets, whereby peat is discharged into the tubes under pressure and some of its moisture is expelled through the several apertures, substantially as described.

44. A charger for peat-machines comprising a rotary sleeve having an axially-arranged series of radial pockets, radially-movable pistons in the pockets, an axially-displaced series of tubes communicating with the pockets, and a cross-tube connected with the series of tubes at their ends removed from the pockets, substantially as described.

45. An apparatus for compressing peat into blocks comprising a rotary carrier, a circularly-arranged series of tables thereon, a series of pairs of radially removable and replaceable mold-frames between adjacent pairs of tables, a charging and discharging table onto which the mold-frames are moved, a platen under the mold-frames to form the mold-bottom during charging, and a reservoir for peat above the platen to fill peat into the mold-cavities, substantially as described.

46. A pair of reticulated mold-frames sliding upon each other, each having projections extending into the other to form the approaching walls of the mold-cavities, substantially as described.

47. A pair of heat-jacketed reticulated mold-frames sliding upon each other, each having projections extending into the other to form the approaching walls of the mold-cavities, substantially as described.

48. A pair of heat-jacketed reticulated mold-frames sliding upon each other, each having projections extending into the other to form the approaching walls of the mold-cavities, and drainage apertures in the projections, substantially as described.

49. The combination of a pair of tables and a pair of reticulated mold-frames sliding upon each other between the tables, each mold-frame having projections extending into the other to form the approaching walls of the mold-cavities, substantially as described.

50. The combination of a pair of heat-jacketed tables and a pair of heat-jacketed reticulated mold-frames sliding upon each other between the tables, each mold-frame having projections extending into the other to form the approaching walls of the mold-cavities, substantially as described.

51. The combination of a pair of heat-jacketed tables provided with drainage-tubes, and a pair of heat-jacketed reticulated mold-frames sliding upon each other between the tables, each mold-frame having projections extending into the other to form the approaching walls of the mold-cavities, which mold-cavities drain through the drainage-tubes and joints provided by the sliding faces of the moving parts, substantially as described.

52. An apparatus for compressing and drying peat into blocks, comprising a rotary carrier, a series of radially-arranged tables rotated thereby, mold-frames between adjacent pairs of tables, and compression devices arranged to hold the series of mold-frames thus constituted under a regulable pressure during the rotation of the carrier, substantially as described.

In testimony whereof I have signed my name to this specification in the presence of two subscribing witnesses.

FRANK WHITE.

Witnesses:
EDWIN S. CLARKSON,
C. E. MARSHALL.